US009467016B2

(12) United States Patent
Stiesdal

(10) Patent No.: US 9,467,016 B2
(45) Date of Patent: Oct. 11, 2016

(54) METHOD OF ATTACHING A MAGNET TO A ROTOR OR A STATOR OF AN ELECTRICAL MACHINE

(71) Applicant: SIEMENS AKTIENGESELLSCHAFT, München (DE)

(72) Inventor: Henrik Stiesdal, Odense C (DK)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 14/657,402

(22) Filed: Mar. 13, 2015

(65) Prior Publication Data

US 2015/0188370 A1   Jul. 2, 2015

Related U.S. Application Data

(62) Division of application No. 13/582,065, filed as application No. PCT/EP2010/059399 on Jul. 1, 2010, now Pat. No. 9,071,104.

(30) Foreign Application Priority Data

Mar. 3, 2010 (EP) .................................. 10155292

(51) Int. Cl.
*H02K 21/12* (2006.01)
*H02K 1/28* (2006.01)
*H02K 1/27* (2006.01)
*H02K 15/03* (2006.01)

(52) U.S. Cl.
CPC ................ *H02K 1/28* (2013.01); *H02K 1/274* (2013.01); *H02K 1/278* (2013.01); *H02K 15/03* (2013.01); *Y02E 10/725* (2013.01)

(58) Field of Classification Search
CPC ............................... H02K 1/27; H02K 21/22
USPC ............ 310/154.03, 154.07, 156.21, 156.19, 310/152, 156.01
See application file for complete search history.

(56) References Cited

U.S. PATENT DOCUMENTS

| 3,772,546 A | * | 11/1973 | Means | H02K 1/17 310/154.16 |
| 4,587,449 A | * | 5/1986 | West | H02K 1/17 310/154.15 |
| 9,071,104 B2 | | 6/2015 | Stiesdal | |
| 2007/0176505 A1 | * | 8/2007 | Trzynadlowski | H02K 21/44 310/114 |
| 2015/0188370 A1 | | 7/2015 | Stiesdal | |

FOREIGN PATENT DOCUMENTS

WO     2011107168 A1    9/2011

\* cited by examiner

*Primary Examiner* — Jose Gonzalez Quinones

(57) ABSTRACT

A wind turbine is provided. The wind turbine includes a generator including a rotor and a stator and a magnet mounting arrangement. The magnet mounting arrangement includes a magnet arranged along a surface of the rotor or stator, a pair of retainers arranged one on each side of the magnet, and an adhesive bonding the pair of retainers to the magnet and the magnet to the rotor or stator.

4 Claims, 4 Drawing Sheets

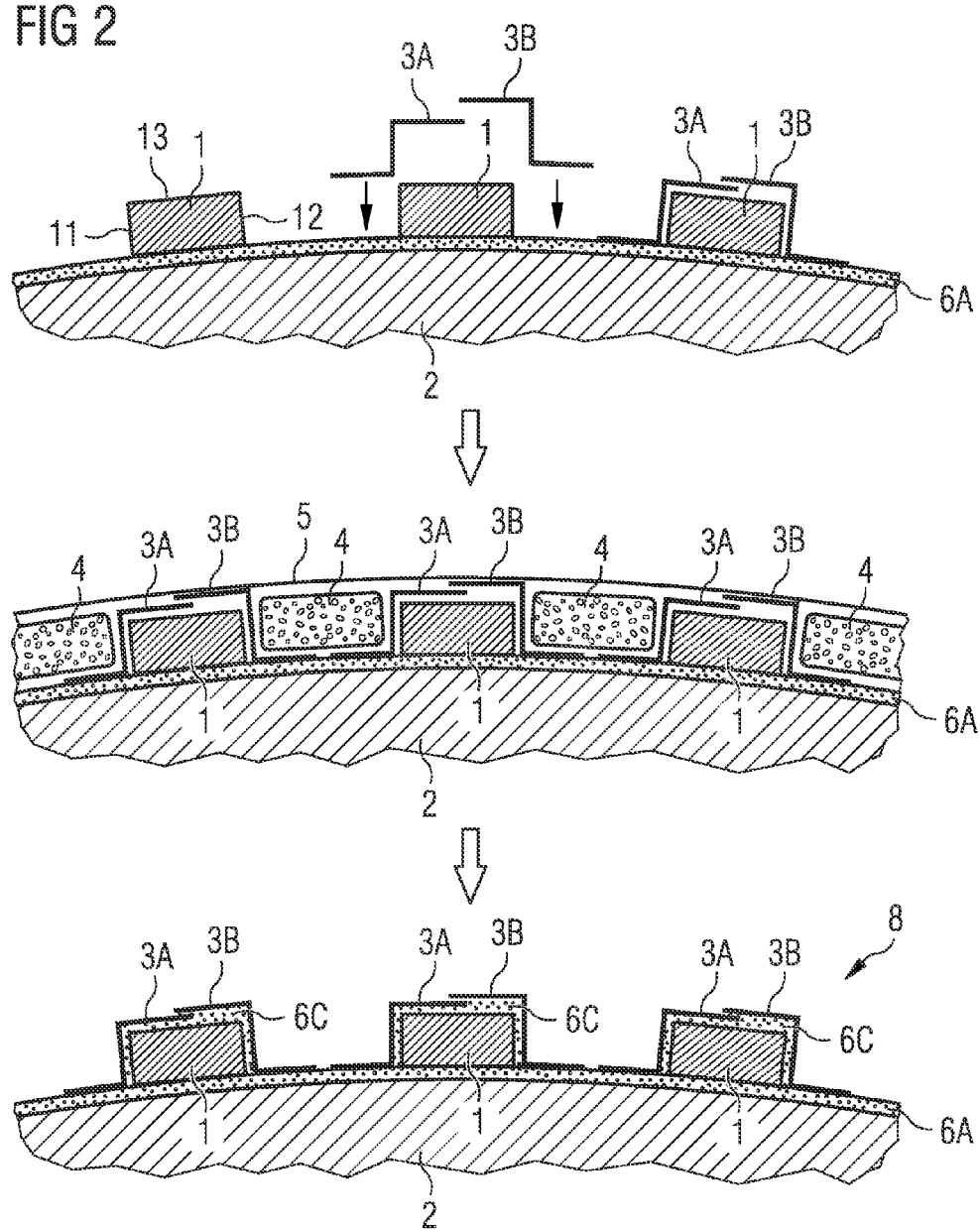

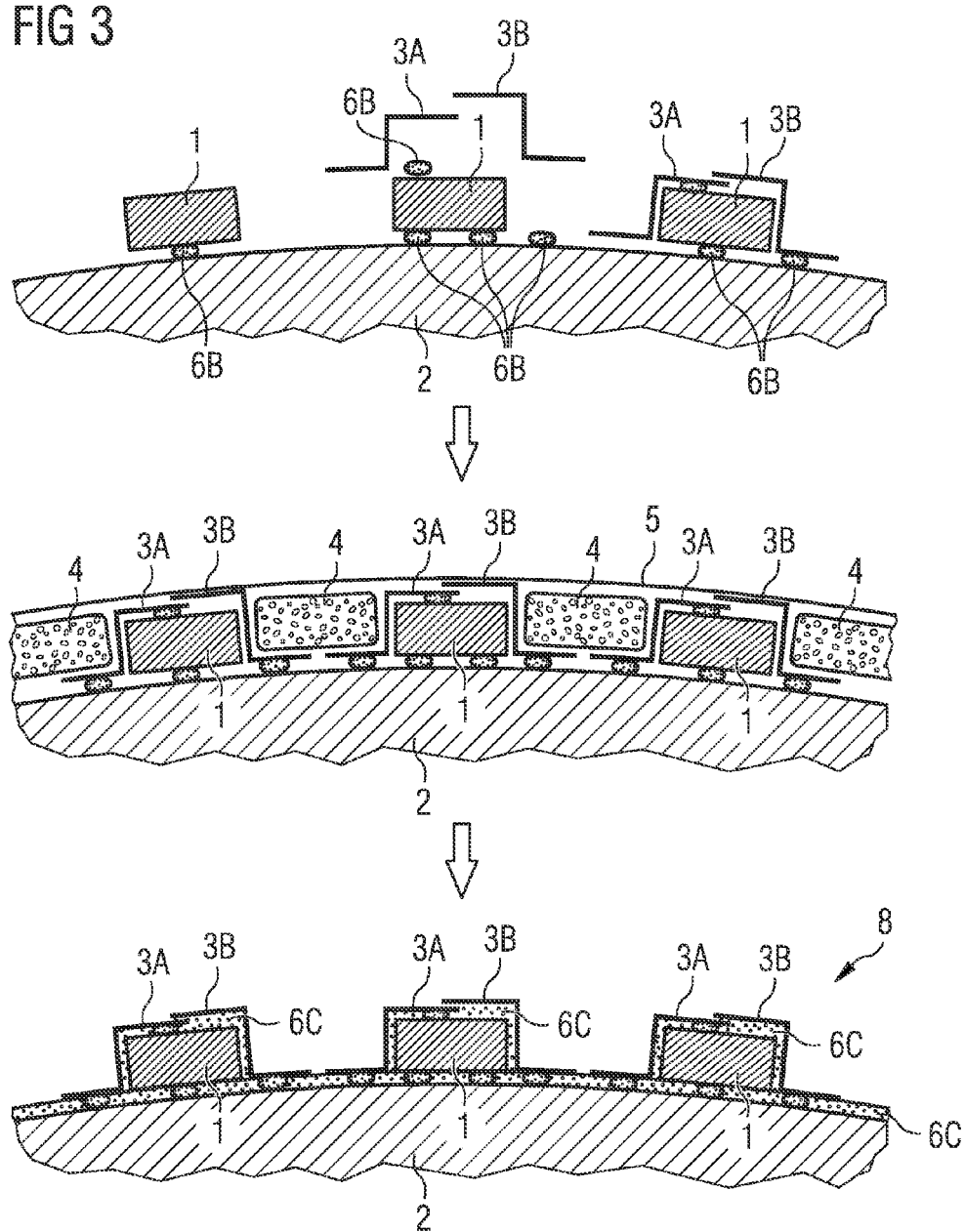

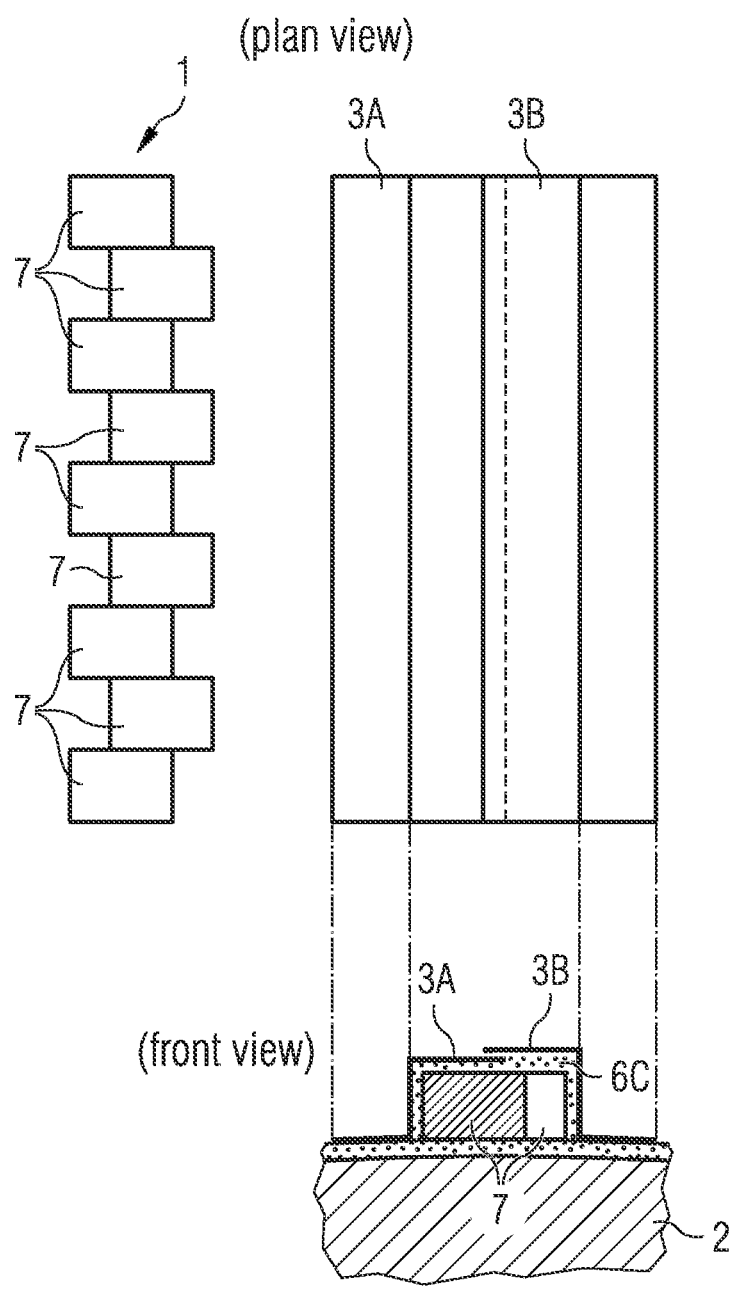

METHOD OF ATTACHING A MAGNET TO A ROTOR OR A STATOR OF AN ELECTRICAL MACHINE

CROSS REFERENCE TO RELATED APPLICATIONS

This application is a divisional of U.S. Ser. No. 13/582,065 filed on Aug. 31, 2012 which is the US National Stage of International Application No. PCT/EP2010/059399, filed Jul. 1, 2010 and claims the benefit thereof. The International Application claims the benefits of European Patent Office application No. 10155292.5 EP filed Mar. 3, 2010. All of the applications are incorporated by reference herein in their entirety.

FIELD OF INVENTION

The invention describes a method of attaching a magnet to a rotor or a stator of an electrical machine. The invention further describes a magnet mounting arrangement, a generator, and a wind turbine.

BACKGROUND OF INVENTION

An electrical machine such as a generator can have a large field (usually the rotor), to which a corresponding large number of permanent magnets or poles is attached. During manufacture, each magnet must be firmly attached to the rotor so that it cannot come loose during operation. For a rotor with a diameter in the range of 2-6 m, a magnet can typically be 1-3 cm in height and 10-20 cm wide. A permanent magnet usually comprises a number of magnet pieces, each with a weight in the region of 10-15 kg. Prior art methods of mounting magnets usually involve attaching each magnet to a steel base of the same width as the magnet, for instance using an adhesive layer, and attaching this unit to the rotor by covering it with a U-shaped steel housing and soldering each housing along its lower edges onto the rotor. The housings ensure that the magnets are protected from corrosion and from mechanical impact. However, this approach is inflexible and expensive, since it requires a steel base for each magnet, a closely-fitting housing for each magnet, and a time-consuming soldering step. Another disadvantage is the additional weight contribution on account of the steel bars.

In an alternative approach, the magnets can be attached to the rotor by gluing them into place, and then wrapping the rotor and magnet arrangement in a fibreglass bandage or envelope. While this solution is considerably more economical than the other prior art technique, it does not provide satisfactory protection against corrosion or mechanical impact.

SUMMARY OF INVENTION

It is therefore an object of the invention to provide an improved method of attaching magnets to the field of an electrical machine.

The object of the invention is achieved by the method of the claims of attaching a magnet to a rotor or a stator of an electrical machine, by the magnet mounting arrangement of the claims, by the generator of the claims, the wind turbine of the claims, and by the use of such a method according to the claims in mounting a plurality of magnets to the rotor of a generator of a wind turbine.

According to the invention, the method of attaching a magnet to a rotor or a stator of an electrical machine comprises the steps of arranging a magnet along a surface of the rotor; arranging a pair of retainers one on each side of the magnet; enclosing the rotor, magnet and retainers in a vacuum bag; and performing vacuum evacuation to consolidate the magnet to the retainers by means of an adhesive.

An obvious advantage of the invention is that, because a pair of retainers is used for the fixation of a magnet, these can be manufactured in a much more straightforward manner than the single prior art U-shaped housing, which must be shaped precisely to fit over the magnet while not leaving too much leeway. Furthermore, the retainers according to the invention need not be soldered into place. Instead, the vacuum consolidation step ensures they are effectively glued to the magnet and to the rotor/stator.

According to the invention, the magnet mounting arrangement for a rotor or a stator of an electrical machine comprises a magnet arranged along an outside surface of the rotor or stator; a pair of retainers arranged one on each side of the magnet; and an adhesive layer bonding the retainers to the magnet.

According to the invention, the generator comprises a rotor and a stator, wherein the rotor comprises such a magnet mounting arrangement.

According to the invention, the wind turbine comprises such a generator.

Particularly advantageous embodiments and features of the invention are given by the dependent claims, as revealed in the following description. Features of the different embodiments can be combined as appropriate to give further embodiments.

The field of an electrical machine can be the rotor or the stator, depending on the way in which the electric machine—for example a generator—is constructed. Usually, however, particularly in large generators, the rotor is the field and bears the magnets, while the stator is the armature and carries the coil windings. Therefore, in the following but without restricting the invention in any way, it is assumed that the electrical machine is a generator and that the magnets are mounted on the rotor, although the method according to the invention for determining a magnet arrangement would be equally applicable to a realisation in which the magnets are mounted on the stator. Here, the term 'surface of the rotor' is to mean the appropriate surface of the rotor to which the magnets are attached. For an electrical machine with the rotor on the outside, enclosing the stator, the magnets will generally be mounted on the interior surface of the rotor to face the stator across an air gap. For an electrical machine with the rotor on the inside and the stator on the outside, the magnets will generally be mounted on the exterior surface of the rotor to face the stator across the air gap. Magnets (or 'poles') are generally rectangular in shape and are attached along their length on the surface of the rotor in a direction parallel to the rotational axis of the rotor. In the following, the term 'upper face of a magnet' is to be understood to mean the face of the magnet opposite to the magnet face that is attached to the rotor/stator. A 'side face' of a magnet is to be understood to mean a face that is essentially perpendicular to the rotor/stator.

The two retainers used to hold a magnet in place may be referred to in the following as a 'retainer arrangement'. In a particularly preferred embodiment of the invention, a retainer is made of sheet metal, whereby the retainer can be manufactured using any suitable process such as deep drawing or pressing. Preferably, the sheet metal is chosen to be easily formed and to maintain its finished shape. For example, steel would be a favourable choice of metal.

The retainers of a retainer arrangement are preferably formed to fit closely along the magnet on at least one face of the magnet. For example, one retainer could be formed by bending a strip of sheet metal lengthwise to give a 90 fold, so that the retainer, when put into place, lies along one vertical face of the magnet. The other retainer could then comprise a complementary part formed by bending a strip of sheet metal lengthwise twice to give two opposite 90 folds. This complementary retainer is preferably shaped so that a central region lies along the opposite vertical face of the magnet, and one side region lies along the upper horizontal face of the magnet so that the outer edge of this retainer meets the outer edge of the other retainer along an upper edge of the magnet. However, the cutting and bending of these two differently-shaped retainers requires some precision in order that they fit satisfactorily, since the part of the second retainer that lies on top of the magnet should, for obvious reasons, not be any larger than the upper magnet face. Therefore, in a particularly preferred embodiment of the invention, a retainer is shaped to essentially cover a side face and at least part of the upper face of the magnet.

In particularly preferred embodiment of the invention, a retaining arrangement comprises a pair of Z-profile retainers, wherein each Z-profile retainer is arranged alone one long side of the magnet. In this preferred embodiment, each retainer is formed by bending a strip of sheet metal lengthwise twice to give a Z-profile. The part of the retainer that is to lie on top of the magnet is preferably at least half the magnet width and at most as wide as the magnet, and the width of this part of the retainer can be anywhere in between these bounds.

In a further particularly preferred embodiment of the invention, therefore, the retainers of a pair are dimensioned to overlap on the upper face of the magnet. In this way, the magnet can be optimally held in place, but the retainers can be manufactured in a fairly straightforward way.

The magnets of a magnet arrangement should preferably be held in place so that they cannot be displaced laterally. Therefore, in a preferred embodiment of the invention, a retainer is shaped to partially lie on the surface of the rotor. After vacuum consolidation, this part of the retainer can be affixed by adhesive to the surface of the rotor. In this case, the part of the retainer that makes contact with the rotor surface can comprise a narrow strip of the retainer material. Alternatively, for adjacent retainers of a pair of neighbouring magnets, the retainers can be dimensioned to meet essentially halfway between the magnets. The part or strip of the retainer that lies on the surface of the rotor can be designed for economy, for example by punching out regions of this strip, or by cutting the strip in a toothed or comb-like manner. In this way, sufficient retainer surface remains to ensure a good contact with the rotor, but only a minimum amount of metal is actually used.

There are a number of ways in which to carry out the steps of arranging the magnets and performing vacuum consolidation. Initially, the retainer and magnet arrangement must be secured in some way to prevent the arrangement from slipping before the vacuum extraction step can be carried out. For example, the retainers could be screwed or bolted into place. However, this is time-consuming and cost-intensive, requiring many small parts and threaded openings. In a particularly simple approach, a magnetic attraction between the magnet and the rotor may be sufficient to hold the magnet in place until it is consolidated to the rotor. If the retainers are also magnetised, the force of magnetic attraction may be sufficient to hold them in place until after consolidation. However, this approach may be insufficient owing to the curved shaped of the rotor and the considerable weight of the magnets, particularly in the case of a large generator.

Therefore, in a preferred embodiment of the invention, the magnets and retainers can be provisionally attached to the rotor and/or to each other. Preferably, the method according to the invention comprises the step of applying an adhesive between the magnet and the retainers. For example, a pair of sheet metal Z-profile retainers can be glued onto a magnet such that the retainers overlap on the upper face of the magnet. In order to ensure that the magnet and retainer arrangement does not slide along the rotor before the curing process can be completed, the method according to the invention preferably also comprises the step of applying an adhesive between the magnet and the rotor.

The step of applying an adhesive can comprise coating the inner surfaces of the retainers sparingly or generously with adhesive, depending on the wetting qualities and the strength of the adhesive used. The lower surface of the magnet (or the corresponding surface of the rotor) can similarly be coated with a layer of adhesive. The entire rotor/magnet/retainer arrangement can then be enclosed in the vacuum bag and any air can be extracted. Atmospheric pressure then acts to press the retainers onto the magnet and to press the magnet onto the rotor, thereby causing the adhesive to spread and fill any spaces. Heat may also be applied to cure the adhesive.

In another approach, the magnets can be provisionally attached to the rotor by spot gluing, i.e. by applying only small amounts of glue to the rotor before putting the magnets in place. Similarly, the retainers can be provisionally attached to the magnet and/or the rotor by spot gluing. Again, this entire rotor/magnet/retainer arrangement can then be enclosed in the vacuum bag and any air can be extracted.

As long as the adhesive is not hardened, the magnets and/or retainers should preferably be prevented from slipping from their desired positions. Therefore, in a preferred embodiment of the method according to the invention, once the magnets and retainers are all in place and before this arrangement is enclosed in the vacuum bag, the method comprises the step of placing inserts between adjacent magnets of the arrangement prior to the vacuum evacuation step. The inserts can be made of any suitable material, for example a light solid material that can be easily cut to shape. Alternatively, the inserts can be made of a thermoplastic material that expands during the vacuum extraction step to fill the space between adjacent magnets. In this way, the inserts effectively prevent the magnets from being displaced until the adhesive has cured or hardened.

Preferably, the vacuum evacuation step comprises a vacuum-assisted resin transfer (VART) step in which an adhesive or resin such as an epoxy resin is pumped into the vacuum bag and drawn or sucked by negative pressure into any spaces between magnet and rotor or between magnet and retainer. As long as the vacuum is applied to the vacuum bag and its contents, atmospheric pressure acts to press the retainers onto the magnet and to press the magnet onto the rotor. Heat may also be applied at this stage to cure the adhesive resin. In this way, the retainers, the magnet and the rotor are consolidated by means of the adhesive during the vacuum evacuation step.

After the curing step, the vacuum bag may be removed. If inserts have been used, these may also be removed. Of course, if the inserts are firmly consolidated between the magnets, and if they do not obstruct the rotor during operation of the electrical machine, they may simply be left in place.

The performance of an electrical machine can be less than ideal, owing to deviations from the ideal in the geometry of the components, the available material, losses in the circuitry, etc. For example, a motor or generator is subject to some amount of cogging and ripple torque. Some approaches to reducing these unwanted forces involve specific arrangements of the rotor magnets. For example, the magnets can be arranged at different distances to each other ('pole-pitching') on the rotor, a magnet can comprise a plurality of staggered magnet elements, etc. In such an arrangement, for a rotor with a diameter in the range of 2-6 m, a magnet can comprise up to about ten magnet pieces or magnet elements, each with a weight of 10-15 kg. In a preferred embodiment of the invention, therefore, the magnet mounting arrangement comprises a number of magnet elements arranged in a staggered manner, and the retainers are dimensioned to overlap on the outer faces of each of the magnet elements of the magnet. In other words, the retainer arrangement is realised to accommodate such magnet arrangements. For example, for such a staggered magnet, the parts of the retainers that are to lie along the upper magnet surfaces are preferably wide enough so that they still overlap, even when the magnet elements are staggered on both sides.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

FIG. 2 illustrates steps of the inventive method of mounting a magnet to a rotor according to a first embodiment;

FIG. 3 illustrates steps of the inventive method of mounting a magnet to a rotor according to a second embodiment;

FIG. 4 illustrates a magnet mounting arrangement according to an embodiment of the invention.

In the drawings, like reference numbers refer to like objects throughout. Objects in the diagrams are not necessarily drawn to scale.

DETAILED DESCRIPTION OF INVENTION

Figure 1:
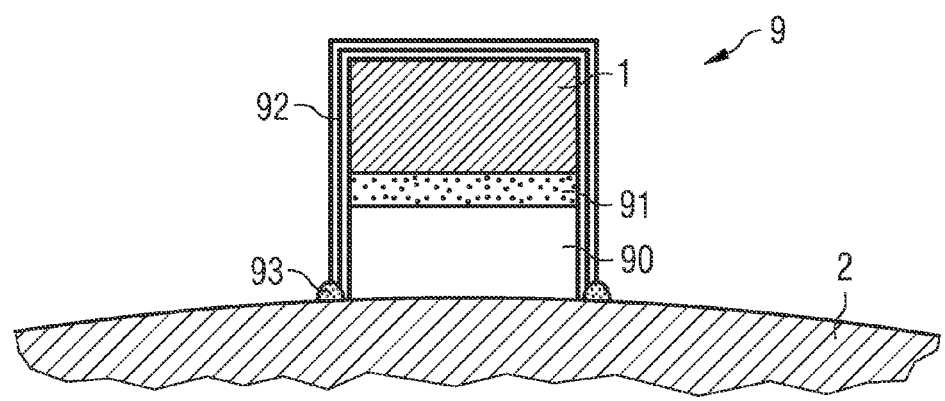
FIG. 1 shows a prior art magnet mounting arrangement.

FIG. 1 shows a prior art magnet mounting arrangement 9 for a magnet 1 and a rotor 2. Many such magnets 1 may be attached to the rotor 2, but only one is shown here for the sake of clarity. The magnet 1 is shown in cross-section, and it will be understood that, for a rotor 2 with a diameter in the region of 2-6 m, such a magnet 1 can typically have a cross-sectional area in the region of 10-60 cm². In this prior art approach, the magnet 1 is first glued to a steel base 90 by means of an adhesive layer 91. The combined base and magnet unit is then covered by a fitted steel housing 92, which in turn is soldered along its outer edges to the rotor 2.

FIG. 2 illustrates steps of the inventive method of mounting a magnet 1 to a rotor 2. In a first stage, as shown in the top of the diagram, an adhesive layer 6A is applied to the surface of the rotor 2, and the magnets 1 are positioned as appropriate. Then, a pair of retainers 3A, 3B are put into place, one on each side of the magnet 1, such that a first retainer 3A lies alongside a first side face 11 of the magnet 1, and the second retainer 3B lies alongside the opposite side face 12. The retainers 3A, 3B are dimensioned so that they overlap on the upper side face 13 of the magnet 1.

Once all the magnets 1 have been covered by retainer pairs 3A, 3B, inserts 4 of thermoplastic material are placed between adjacent magnets 1, as shown in the next stage. Then, the entire arrangement of rotor 2, magnets 1, retainers 3A, 3B and inserts 4 is enclosed in a vacuum bag 5. During a vacuum extraction step, the adhesive 6A can be drawn into the spaces between magnet 1 and retainer 3A, 3B. Additionally, an epoxy resin adhesive 6C can be pumped into the vacuum bag by means of a suitable nozzle (not shown in the diagram) and distributed by negative pressure into any gaps and spaces between the magnets 1, the rotor 2 and the retainers 3A, 3B. Heat may be applied to the entire assembly—for example infrared or UV radiation—to cure the adhesive 6A, 6C. Once the adhesive 6A, 6C has hardened, the magnets 1, retainers 3A, 3B and rotor 2 are consolidated in a magnet mounting arrangement 8, as shown in the lower part of the diagram. In this way, the magnets 1 are protected from corrosion and mechanical impact b the retainers 3A, 3B, while also being fixed firmly in place by the adhesive bond between retainers 3A, 3B and rotor 2.

FIG. 3 illustrates the steps of an alternative method according to the invention. Here, the magnets 1 are spot-glued to the rotor 2 using small amounts of adhesive 6B. Similarly, retainer pairs 3A, 3B are spot-glued to the corresponding magnet 1 and/or the rotor 2 as shown in the upper part of the diagram. In this way, the magnets 1 and retainers 3A, 3B are provisionally held in place. Inserts 4 of thermoplastic material can then be laid into place between adjacent magnets 1, and the entire assembly—magnets 1, retainers 3A, 3B, inserts 4 and rotor 2—can be enclosed in a vacuum bag 5, as shown in the next stage. Again, a vacuum extraction step is then performed, in which an adhesive resin 6C is drawn into any spaces between magnets 1, rotor 2 and retainers 3A, 3B in a VART process. After the resin 6C has cured, the vacuum bag 5 and inserts 4 are removed to expose the consolidated magnet mounting arrangement 8, as shown in the lower part of the diagram, in which the magnets 1 are securely fastened to the rotor 2 and protected from corrosion by the retainers 3A, 3B.

FIG. 4 illustrates part of a magnet mounting arrangement according to an embodiment of the invention. Here, a magnet 1 comprises several magnet elements 7, arranged in a staggered manner on the basis of an optimisation of the performance of the electrical machine of which the magnet 1 is a part. For example, the staggered magnets 7 may serve to reduce the cogging torque of the machine. The staggered arrangement of magnet elements 7 results in a wider overall width of the magnet 1. Therefore, retainers 3A, 3B are dimensioned accordingly so that they overlap to cover the upper surfaces of all the magnet elements 7 parallel to the axis of rotation of the rotor 2, as shown in the plan view on the upper right of the diagram. The vacuum extraction step is performed in the same way as described above, with the use of inserts between the magnets 1 if required, and any spaces between the magnet elements 7 and the retainers 3A, 3B can be filled with epoxy 6C during the VART process. In this way, even such a complex arrangement of magnet elements 7 can be easily and securely affixed to the rotor 2 in a particularly straightforward and economical manner.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

We claim:

1. A wind turbine, comprising:
    a generator, comprising:
        a rotor, comprising:
            a magnet mounting arrangement for a rotor or stator of an electrical machine, comprising:
                a magnet arranged along a surface of the rotor or stator;
                a pair of retainers arranged one on each side of the magnet; and
                an adhesive bonding the pair of retainers to the magnet and the magnet to the rotor or stator,
                wherein each retainer of the pair of retainers is shaped to essentially cover a side face and at least part of the upper face of the magnet,
                wherein the pair of retainers are dimensioned to overlap one another on the upper face of the magnet; and
        a stator.

2. The wind turbine according to claim 1, wherein a retainer of the retainer pair comprises a sheet metal retainer.

3. The wind turbine according to claim 1, wherein a retainer comprises a Z-profile retainer.

4. The wind turbine according to claim 1, wherein the magnet includes a plurality of magnet elements arranged in a staggered manner, and the retainers are dimensioned to overlap on the upper faces of each of the magnet elements of the magnet.

* * * * *